United States Patent [19]
Hoffberger, II et al.

[11] 3,781,471
[45] Dec. 25, 1973

[54] TELEVISION SCREEN LIGHT SHIELD

[76] Inventors: Charles C. Hoffberger, II, 200 Cross Keys Rd., Baltimore, Md. 21210; Charles A. Rivlin, 2245 Regene Dr., Baltimore, Md. 21209

[22] Filed: Dec. 27, 1972

[21] Appl. No.: 319,005

[52] U.S. Cl. .................... 178/7.82, 178/7.9, 353/75, 353/97
[51] Int. Cl. .......................... H01j 24/06, H04n 5/64
[58] Field of Search ............................ 178/7.82, 7.9; 353/74, 75, 97

[56] References Cited

UNITED STATES PATENTS

| | | | |
|---|---|---|---|
| 3,462,852 | 8/1969 | Emerson | 178/7.82 |
| 3,564,138 | 2/1971 | Harrold | 178/7.9 |
| 3,733,436 | 5/1973 | Rose | 178/7.82 |

*Primary Examiner*—Howard W. Britton
*Attorney*—Sidney W. Russell

[57] ABSTRACT

An extremely simple and inexpensive light shield or shroud for television screens, adjustable in nature, for encircling the screen of a television set (or the front end of the set itself), thus enabling viewing of the screen in sunlight or other areas where excessive light reduces the contrast in the screen such as to otherwise prevent adequate viewing. In collapsed form, the shield lies flat for shipment or storage purposes, yet it can be readily pivoted in place, with the two adjustable sides being raised, together with the top, and then conformed in dimension to the top and sides of the television set, thus to adequately shield the screen from sunlight (or artificial glare) by the resultant enclosure. The entire assembly is pivoted to a baseboard upon which the set rests, a pivoted frame attached to said baseboard providing support for the two top and two side elements, each of said elements having a pivoted, adjustable means permitting variation in size (height and width) to accommodate the particular size of the set to be used. Such adjustments, once made, are fixed in position by suitable clips and/or a pin-slot arrangement having a built-in retention ability, thus providing assurance that the unit is fixedly maintained in adjusted position.

9 Claims, 5 Drawing Figures

TELEVISION SCREEN LIGHT SHIELD

BACKGROUND OF THE INVENTION AND PRIOR ART

The present invention relates broadly to a portable and adjustable device for the shielding of the screen of various types of image projecting devices or apparatus, such as television receivers, oscilloscopes, and so on. In more particular the improvement represented by this invention is most suitable for use with the portable type of television set, th latter being of light weight and quite readily transported from place to place. With regard to this type of instrument it is of course obvious that the same is marketed in various different sizes and that accordingly, any type of light shield or shroud for the screen which itself is of a fixed size would only be suitable for use for one definite and standard size television apparatus.

It is thus manifestly undesirable to manufacture any type of light shield which is not suitable for adjustment to different size television screens or sets. Similarly, it is equally undesirable to provide such a type of device which is permanently attached to the set, not easily removable, and completely unnecessary for use with such apparatus when the latter is utilized under proper lighting conditions so that the image transmitted to the screen thereof is readily observable. The problem more commonly arises when an ordinary portable television receiver, for example, is taken from indoors to the outside where it is subjected to direct exposure to sunlight. Here the glare from the sun is such that, unless the screen be shielded or protected in some manner, the image appearing thereon is exhibited with little or no contrast with the background, and is thus hardly observable at all. Hence light shields of this invention find particular use when the set is taken outdoors, such as to a picnic area or aboard a pleasure boat, etc. There is therefore an immediate need for the type of device represented by the invention herein disclosed and claimed.

Typical prior art schemes seeking the same solution are of the type adverted to above: fixed shields, meaning more or less permanently attached to the receiver casing, and most importantly, not adjustable in nature. For example, the devices represented in such U. S. Pat. as Nos. 3,329,770, 3,329,771 and 3,564,138, although aiming toward a similar concept insofar as shielding be concerned, are not adaptable to the uses to which this present invention is addressed. Primarily, they involve the fixed type of arrangement above referred to, meaning they are permanently attached to the receiving apparatus in one way or another, or at least requiring considerable effort to attach to or detach from the set. More significant, they are not adjustable as to height or width and, therefore are useful only in connection with a predetermined size of television apparatus. In the first two of the above mentioned patents certain flaps mounted on the sides and top of the set are more or less permanently attached thereto and prefabricated, or must be prefabricated, only for use with a television apparatus of a particular size. Such elements are thus not adaptable for transfer to a set of different dimensions. The remaining two patents reside in the same category-shielding devices, more or less in the nature of folded, extendable flaps, are of predetermined size and limited to mounting to only the certain dimensions of a given television apparatus.

Another disadvantage of such prior art devices, aside from their lack of adjustability, is that the same are not conductive to folding in a completely flattened position, this for the purpose of either shipment or retail sales, or for storage purposes, as when shielding of the screen is completely unnecessary, i.e., when the television is being used in shaded areas, as indoors, under proper lighting conditions enabling adequate viewing. In any event, in this latter regard, the instant invention is susceptible to complete folding into a collapsed position upon a unitary baseboard. All elements of this shielding device are so pivoted in such interrelated fashion as to permit not only rapid extension and adjustment to the shielding position, but to permit equally facile return to an original position wherein all of the shielding elements are mounted flatly and in parallel relationship upon the baseboard to which they are pivotally and/or hingedly mounted.

OBJECTS OF THE INVENTION

It is therefore a primary object of this invention to provide a shield or shroud means for an image exhibiting apparatus having a viewing screen which is adjustable in nature, meaning that it is variable within the option of the operator as to both height and width, so that same can be readily fitted to almost any size of such apparatus having some form of screen upon which this type of image is projected. Once in place, the assembly completely excludes light from impinging upon the screen, thus to permit adequate viewing in such as sunlit areas.

It is another object of the invention to provide a device of such type that when not in use, or when for example, shipped for sale, the same can be easily and quickly collapsed to a completely flattened position wherein each of the shield elements interfolds or overlaps with the others. This permits the assembly to be pivoted downwardly, thus to lie flat upon the baseboard. The latter provides support for all of the units of the assembly, which are in turn pivotally attached, through means to be described, to the baseboard.

It is a further object of our invention to provide such an improved shielding device wherein once the proper adjustment to a given screen device be made by use of a plurality of overlapping top side members, which in each instance are pivoted to each other, the same may be retained in the final adjusted position to remain there for as long a time as necessary.

It is still another objective of our invention to provide a shielding means, as referred to in the foregoing, wherein the main support thereof resides in an underlying baseboard to which is pivotally attached at its forward end, a U-shaped element or rod providing support for the remaining parts of the assembly. In this regard, two overlapping top shielding elements are also pivoted at their forward ends to the central portion of this U-shaped rod. On each of the depending legs of such latter member, and in each instance, two additional side shielding members are pivoted together at their forward ends. This permits variation in overall width and height of this type of enclosing means by overlapping of such shields to the desired extent, thus rendering same adaptable to any set size as may be desired.

It is another object of the invention to provide a device of the foregoing type which may be fabricated at extremely low cost, in the sense that the baseboard, top and side elements may be made of such light and inexpensive materials as cardboard, hard board, plastic, or light metals. The pivoted forward support may comprise merely a light metal rod, fashioned into a shape as more particularly described below. The entire unit, of such simplified nature, permits economic replacement when worn, or when perhaps damaged through inadvertence.

DESCRIPTION OF DRAWINGS

The structure and mode of operation of our invention may be more fully described and better understood by reference to the accompanying drawings, wherein.

DETAILED DESCRIPTION OF THE INVENTION

Figure 1:
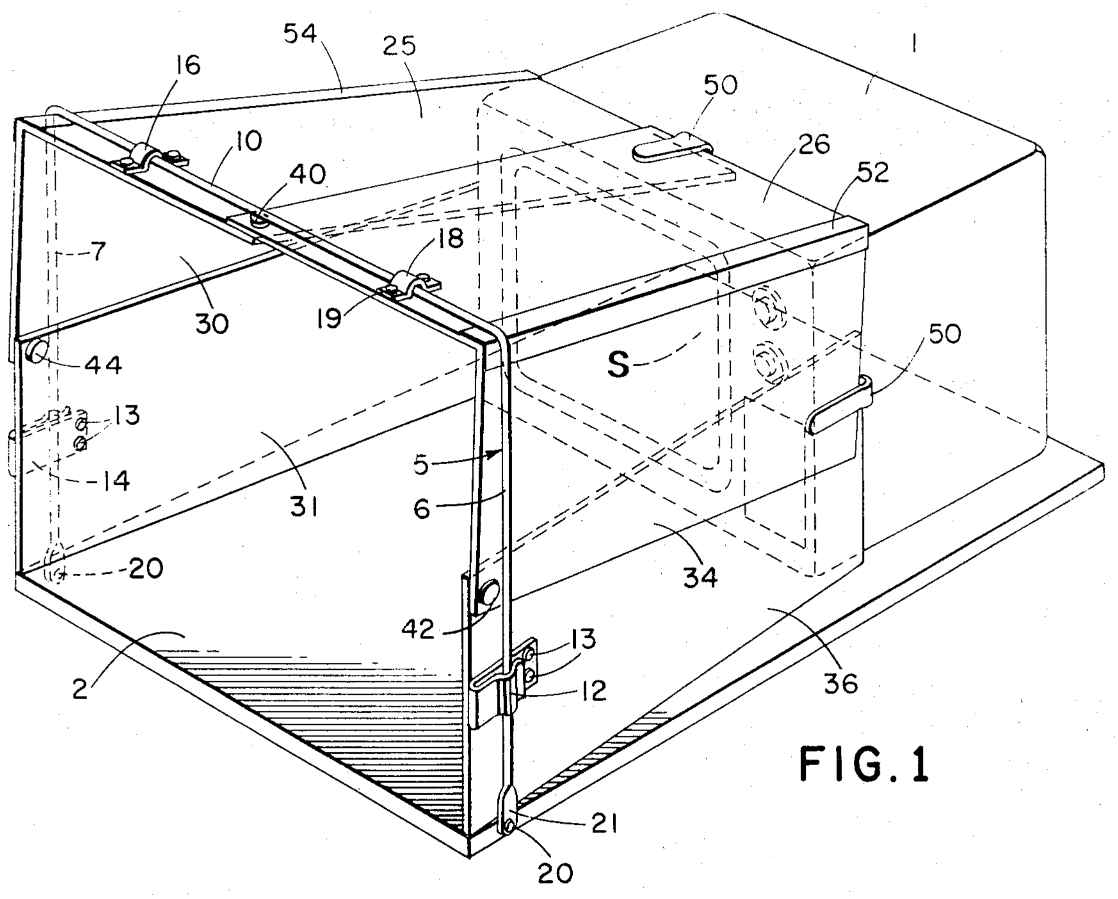
FIG. 1 is a perspective view of the invention shown in extended and adjusted position to shield the screen of such instruments as a television set of predetermined size. This Figure illustrates the various pivot points of the top and side elements thereof, as well as one form of clip means utilized to maintain such respective elements in this adjusted position around the screen a chassis of the television apparatus.

With reference now to FIG. 1, the invention hereof is shown in assembled and fixed relationship to the screen to be used, the herein deployment or arrangement being described with regard to a television set of the portable type. This latter, together with the other assemblies of the involved invention, is mounted upon a baseboard 2. The latter is fabricated of such material as simply to afford enough strength, with accompanying lasting quality, to support the U-shaped element, generally indicated at 5 and preferably comprising a metallic rod. As will be noted, this baseboard 2 is of sufficient length, in the preferred embodiment of the invention, to support not only the television apparatus 1 but also to provide for pivoted support of the U-shaped element at its opposite end, and as illustrated in this figure.

This U-shaped element 5 is comprised, as shown, of a middle or central portion 10 and two depending side portions or extensions 6 and 7 respectively. These side portions are more or less right-angularly disposed to the middle portion 10, again as illustrated, but of course may deviate somewhat from such 90° angle, and within the contemplation of the invention.

The television set here illustrated is of course provided with a viewing screen, here designated at S, the latter facing the opposite end of the baseboard 3. Referring to each of the side panels (two overlapping panels to each side) the same are pivoted, as indicated at 12 and 14, by pivot clips, suitably attached to the lower side panel in each instance by rivets or equivalent means indicated at 13.

The two overlapping top panels of the structure are similarly in pivotal relationship with the middle section 10 of the U-shaped bar 5, and this via bearing members 16 and 18 respectively. These latter bearing members have a centrally provided raised portion to accommodate the bar 10, and each of them are fastened to their adjacent and respective overlapping top panel by means of suitable rivets 19, or any other suitable fastening media known to the art.

The angularly disposed end portions 6 and 7 of the U-shaped rod 10 are flattened as at 21 to enable formation of an appropriate aperture in the latter to receive fastening fixtures 20. These latter, with either bolts, rivets or screws, connect the lower ends of the rod 5 to the forward part, or end, of the assembled shielding device. Thus it is plain that the rod member 5 may be rotated around pivot elements 20 in such fashion as to permit swivelling of the entire structure from the position shown in FIG. 2 to that shown in a manner to be hereinafter described.

The two overlapping top members are elements 25 and 26, pivoted as mentioned above to the frame 10, by the devices 16 and 18. These may be rectangular in configuration, as shown, but also fabricated in the form of trapezoids, if more overlapping or more extensive adjustment to the size of the screen or apparatus is desired. Also, although only two such top members are shown, more may be utilized. As shown in the drawings, these two top members 25 and 26 are pivoted at pivot 40; thus when together, as depicted in FIG. 1, the lateral size or width of the apparatus can be met with precision.

Similarly each side, and as above noted, consists of two parts, again overlapping with respect to each other. As with respect to the top members, more than two side members on each side may be used. In any event, viewing FIG. 1, the facing side is comprised of two panels 34 and 36. Again, these are preferably rectangular in configuration and pivoted to each other via such as pivot 42. The opposite side elements, represented at 30 and 31, are of similar and matching configuration. These two panels (30 and 31) are pivoted to each other through a like pivot pin 44. The function of these representative side panels on each side of the assembly is thus the same as that with regard to top panels 25 – 26. Whereas the latter permit pivoting outwardly and inwardly for adjustment to the accurate width of the unit to be screened, the side panels 30, 31 on the one hand, and 34, 36 on the other (and through pivots 44 and 42) respectively, permit the same to be adjusted evenly to the desired height to match the corresponding height of the apparatus or screen to be viewed.

It is of course essential that the side and top panels as herein before described be hinged in some fashion and at adjacent matching points or contacting areas. To this end flexible fabric hinges are preferred, although of course, more elaborate hinging means may be employed. In any event, in the embodiment of the invention herein shown fabric hinge 52 hinges together top panel 26 and side panel 34. On the other hand, and at the other side of the assembly, fabric hinge 54 hinges together top panel 25 and side panel 30. Thus such arrangement of hinge elements, whatever their type, permit, and conveniently so, the unfolding of the entire assembly from the flat, storable position shown in FIG. 2 to the operable position of FIG. 1, and in a way to now be described.

Figure 2:
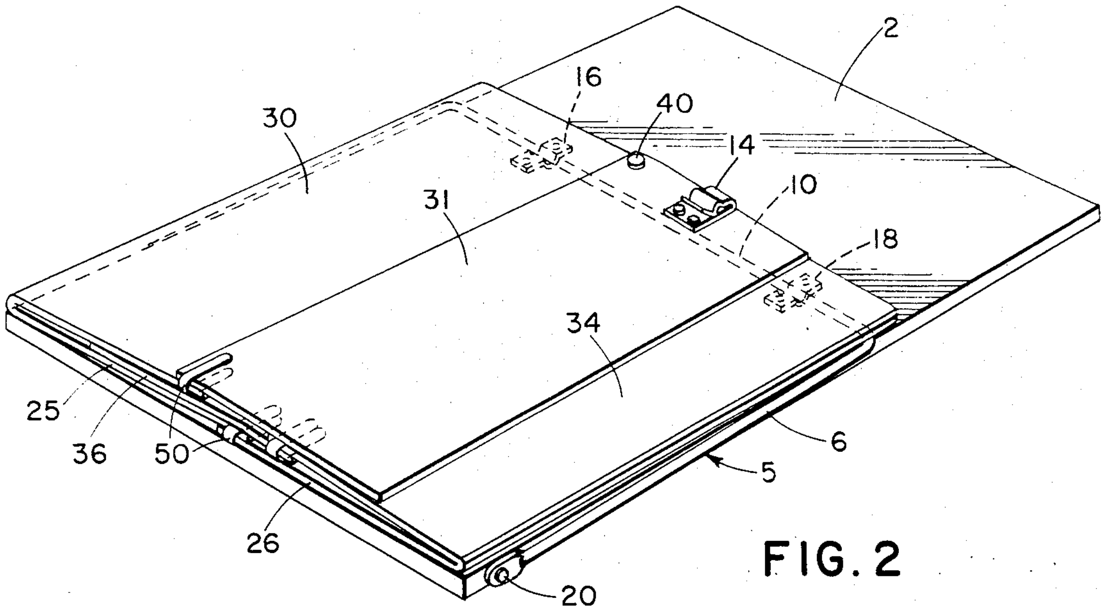
FIG. 2 is a perspective view of the invention showing the various elements in folded relationship with respect to each other, thus to lie flat upon the underlying baseboard to which the U-frame is attached in pivoted fashion.
Figure 3:
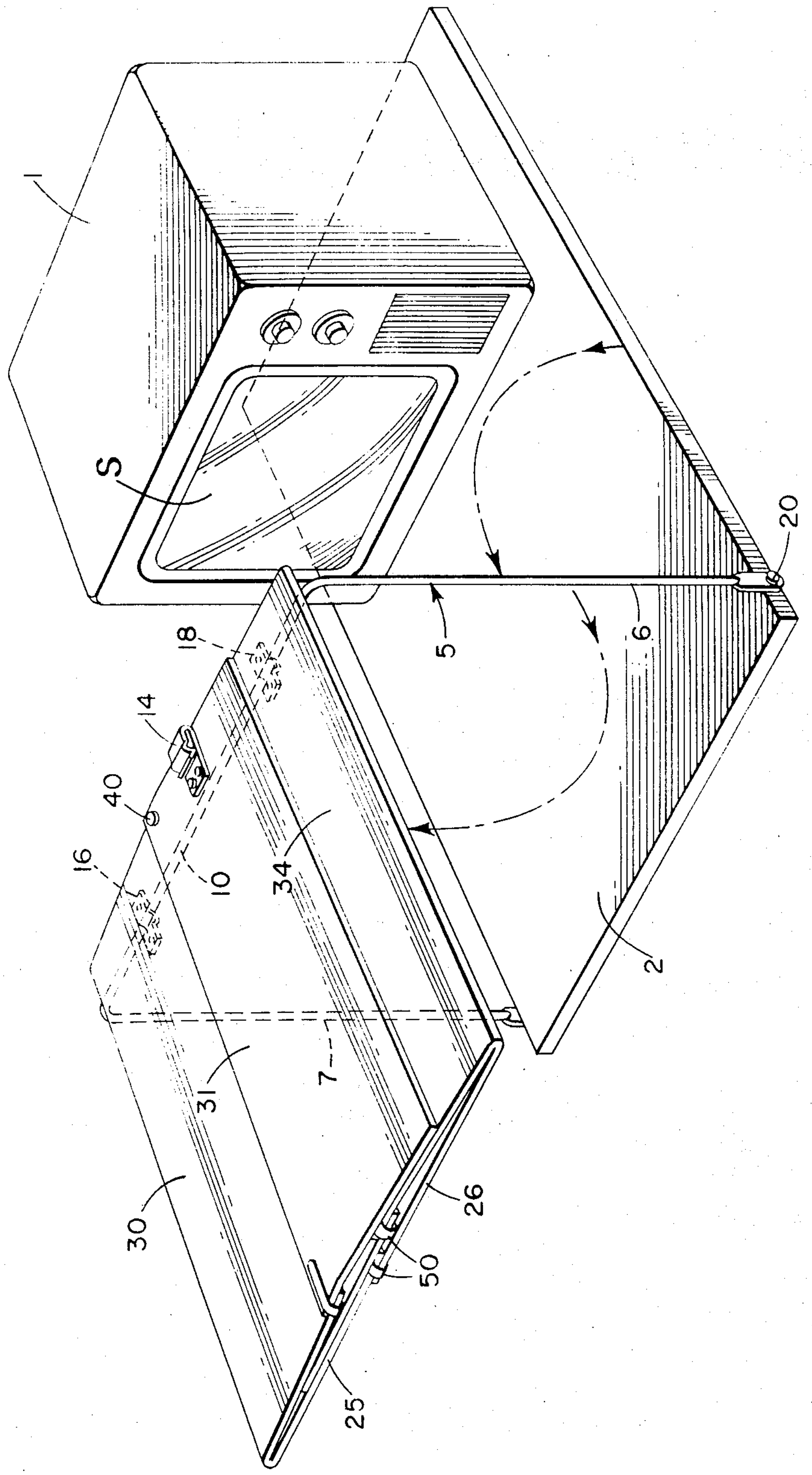
FIG. 3 is a perspective view of the invention depicting the first step in unfolding or raising the various screening elements from the baseboard, in which the U-frame upon which all are pivotally mounted, is first raised to vertical position and such side and top elements raised to an approximately horizontal position.
Figure 4:
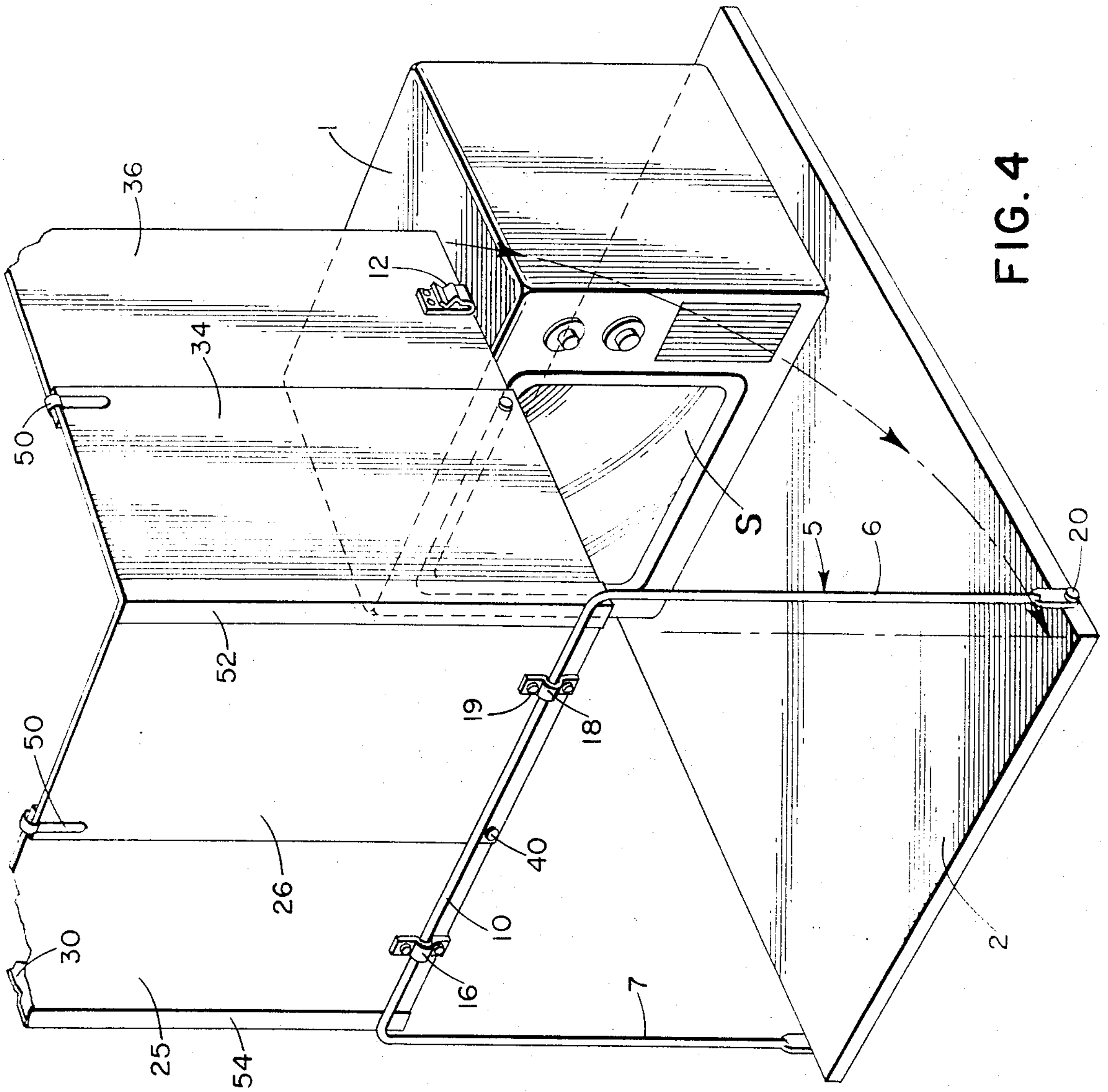
FIG. 4 illustrates the next step in the mounting of this device wherein the top elements, as well as both pairs of side elements are unfolded and extended in the manner shown preparatory to swinging them downwardly over the television receiver, thus to be disposed in shielding position. The final adjustment, after the movement illustrated in FIG. 4, is of course found in FIG. 1, where such top and side elements are so rotated about their respective pivot points as to bring these respective members overlapping with respect to each other and into contact with the top and sides of the receiver, i.e. into a finally adjusted position wherein the T.V. screen is totally shielded.

The manner of disposition of the unit from a flat to operative position is illustrated in FIGS. 2, 3 and 4. FIG. 2 of course depicts the assembly in a folded or collapsed position wherein all shielding flaps lie parallel to the baseboard, and are disposed parallel and closely proximate thereto.

The first manual maneuver, in locating the shield for ultimate use, is illustrated in FIG. 3. Here it is seen that the rod formation 5 is raised in an approximately vertical position, this by means of the pivot points 20 in which each of the segments 6 and 7 terminate. Direction of rotation to this vertical position is indicated by the arrows in FIG. 2. At this point the folded flap or shield members are likewise vertical; they are then raised or rotated clockwise ( viewing FIG. 3) to an approximately horizontal position, as there shown. Continued rotation of the assembly in the same direction raises the folded elements to the vertical position as depicted in FIG. 4. At this point the side members 25, 26 and 34, 36 are vertically extended. The entire assembly is then rotated donwardly in the same clockwise direction and as indicated by the arrows in FIG. 4. This results in the back edge of the shielding elements surrounding and enclosing the face of the television receiver. The latter of course has already been positioned upon the rear end of the baseboard, the weight of that apparatus alone also maintaining the baseboard in position for these adjustment steps.

After location of the assembly as herein before described the fianal adjustment is made: here the two side elements 30, 31 are brought together to overlap each other at the rear ends thereof via pivot 55. A corresponding movement is made with respect to the rear edges of the two side elements 34, 36, pivoted about the pivot point 42, thus to overlap 34 with 36. This brings the two top segments 25, 26 into contact with the top of the television receiver, granting proper overlap in sufficient amount, of the respective side members. It is now only necessary, the height of the shield having been adjusted to the height of the receiver, to adjust the width of the unit to the width of the receiver. This is simply done by rotation towards each other of the ends of the two top elements causing them to similarly overlap at the rear ends thereof. These latter, as indicated, pivot about pivot pin 40, so that said side members are also snugly fit against the respective sides of the receiver. The face or screen of the receiver is now completely enclosed, shielded from the glare of outside (or undue inside) light, and in a darkened area such that no matter where located the screen can be readily used under proper contrast conditions acceptable to the viewer.

It makes of course no difference whether the top is or the sides are adjusted first, common sense dictating that the simple operation of increasing the overlap between these various shielding parts, will result in a close, contacting fit with the top and sides of the receiver, and irrespective of the particular size of the latter. Obviously also, the two lower side members, represented by the numerals 31 and 36, rest upon the baseboard 2 and in such contrast therewith as to preclude entry of light therebetween.

For collapse of the unit the same steps are used but in reverse: the overlap of the several shielding members is increased to that shown in, e.g., FIG. 4, the assembly lifted to the position there shown, and with continued counter clockwise movement about the shaft or rod 10 until assuming the lateral position shown in FIG. 3. The elements are then folded as as also there illustrated and the U-shaped element 5 rotated about it pivot points so that again, the folded unit rests in a flat position upon the baseboard and parallel thereto.

As indicated above, once the adjustment has been made to achieve the shielding position shown in FIG. 1, suitable clips 50 are used to assure that the proper extent of overlap is maintained in a relatively fixed position to assure continued contact with the receiver cabinet. These clips are positioned centrally of the overlap, and this with respect to both top and sides, and as so depicted in FIG. 1.

Figure 5:
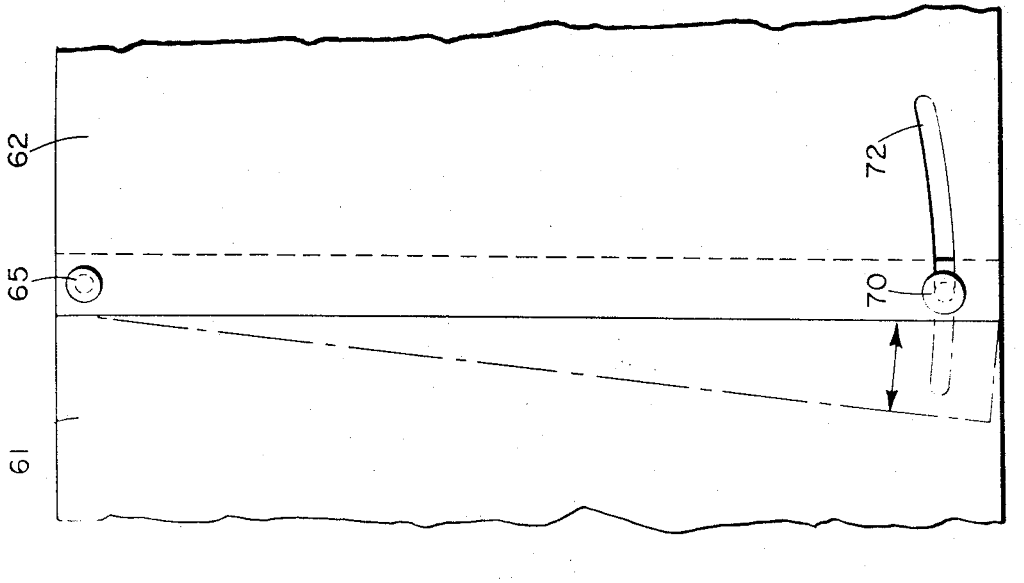
FIG. 5 illustrates a modification of the invention wherein the means to maintain the top and side members in adjusted position takes the form of a pivot fixedly mounted in one overlapping member and a slot of arcuate configuration complementary thereto, the latter being adapted to receive said pin in sliding fashion but with such frictional contact as to relatively firmly retain the amount of overlap after adjustment has been made.

As an alternate embodiment of the invention a different form of means may be utilized to retain the various shielding plates (both top and sides) in the fixed position and in the manner just referred to above. This alternate may take the form of that shown in FIG. 5. This figure represents the structure of an adjustable holding means used with respect to either the two top pieces or the two adjacent sides on each side of the unit, or both. For purposes of illustration, in FIG. 5, 61 and 62 represent either side or top elements. At their forward ends (away from the screen or chassis of the set) they would be provided with the same type of pivot pin 65 as herein before referred to. However, at the rear ends of these overlapping media, one of them may be provided with a rivet or bolt means of any type common to the art. This is fixed to one (here shown as the underlying piece) of such shielding elements. The overlapping member is provided with an arcuate slot 72, of such length as would represent the total amount of overlap permitted between these two members. A rivet or other suitable means 70, affixed to member 61, is fitted within such arcuate slot, and as shown in FIG. 5. The intermediate shaft of the rivet is of such diameter as to snugly fit within the slot 72. The purpose of the latter is to permit manual adjustment to be made, but such accompanied by that frictional contact necessary between rivet and slot as will maintain the adjusted and overlapping pieces in place. To this same end, and where the rivet 70 is so mounted in the end of plate 61, as shown in FIG. 5, the head of the rivet may be fixed at such a distance above member 61 as to rather closely embrace the thickness of element 62 adjacent the slot area. Here again, frictional engagement, although subject to manual movement, will additionally maintain these two complementary parts in that predetermined relationship as so adjusted by the operator.

Although we do not intend the scope of our invention to be limited, as to size, and regarding the various elements of the assembly, an example of suitable and practical dimension is as follows: a convenient size for the baseboard involves a 20 inch width and a 28 inch length. The U-shaped rod or loop referred to above, and having this baseboard dimension in mind, is 21 inches with regard to the middle portion thereof, the legs or angled end portions extending therefrom, being of a length of 17 inches each. Each of the shielding and overlapping members herewith with respect to the top as well as the sides are of the same dimensions, and namely, 9 inches wide and 18 inches long. Such size would be suitable for use with a large variety of television receivers, particularly the portable type.

In any event, those skilled in the art will be cognizant that many variations of the apparatus specifically described herein are included within the broad scope of our invention. For example, instead of the clip formation used to maintain the flaps or shields in adjusted position, or alternatively, the pin-slot arrangement for the same purpose as described above, other possible mechanical devices may be used. As already stated, the selection of the type of materials for fabrication of the unit is practically unlimited, and within the confines of practicality and low cost construction.

By way of summary, the advantages of our invention are many. The unit is light and durable and requires no skill whatsoever for placement and adjustment for use, and return from that position to the flat storage position. Its low cost in construction permits of a low retail price, thus being more appealable and saleable to the consumer. Most importantly, it eliminates the need for any more than a single one of these units to fit many variations in sizes of television receivers. This fundamental departure from the prior art, as we have above noted, results in eliminating any fixed attachment of predetermined sizes of pieces to fit a particular size of television, or other type of receiver for a screen upon which an image is projected.

We claim as our invention:

1. An adjustable shield for a screen of an apparatus enabling imposition of images thereon comprising a baseboard of sufficient size to permit placement of said apparatus on one end thereof, a pivoted shield supporting rod of approximately U-shaped configuration at the other end of said baseboard, said rod having a middle portion and angled end portions extending therefrom, means to pivotally attach the ends of said angled portions of said rod to said other end, two top screen members pivoted together and to said middle portion of said rod in overlapping relation, two side screen members pivoted together and in overlapping relation to each of said end portions of said rod, and means to maintain the amount of overlapping of said members nearest the apparatus in predetermined position, whereby said shield as to height and width may be readily varied to suit different sizes of said apparatus and screen.

2. The adjustable light shield of claim 1 wherein said means to maintain the amount of said overlapping comprises clip elements at the ends of said members adjacent said one end of said baseboard.

3. The adjustable light shield of claim 1 wherein said means to maintain the amount of said overlapping of said members comrpises a pin in one of said overlapping members and an arcuate slot designed to frictionally engage said pin in the other of said members.

4. The adjustable light shield of claim 1 wherein said baseboard is of such length as to accommodate said apparatus thereon at said one end and permit positioning of said pivoted rod at said other end with said top and side members not extending substantially beyond said other end.

5. The adjustable light shield of claim 1 wherein said overlapping side members are provided with forward retaining clips adapted to removably retain said side members in engagement with said angled end portions of said supporting rod.

6. The adjustable light shield of claim 1 wherein the upppermost of each of said side members is provided with hinge means engaging the outside edge of the outside of said top members, whereby to permit rotational movement of said side members with respect to said top members to adjusted position with respect to said apparatus.

7. The adjustable light shield of claim 6 wherein said hinge means comprises flexible fabric strips attached to the top edges of said side members and the side edges of said top members.

8. The adjustable light shield of claim 1 wherein each of said angled end portions are disposed at an angle of approximately 90° to said middle portion.

9. The adjustable light shield of claim 1 wherein each of said top and side members are of such length as to overlap the top and sides of said apparatus in contacting relationship, thereby to exclude light from penetrating to or near said screen of said apparatus.

* * * * *